United States Patent Office 3,094,571
Patented June 18, 1963

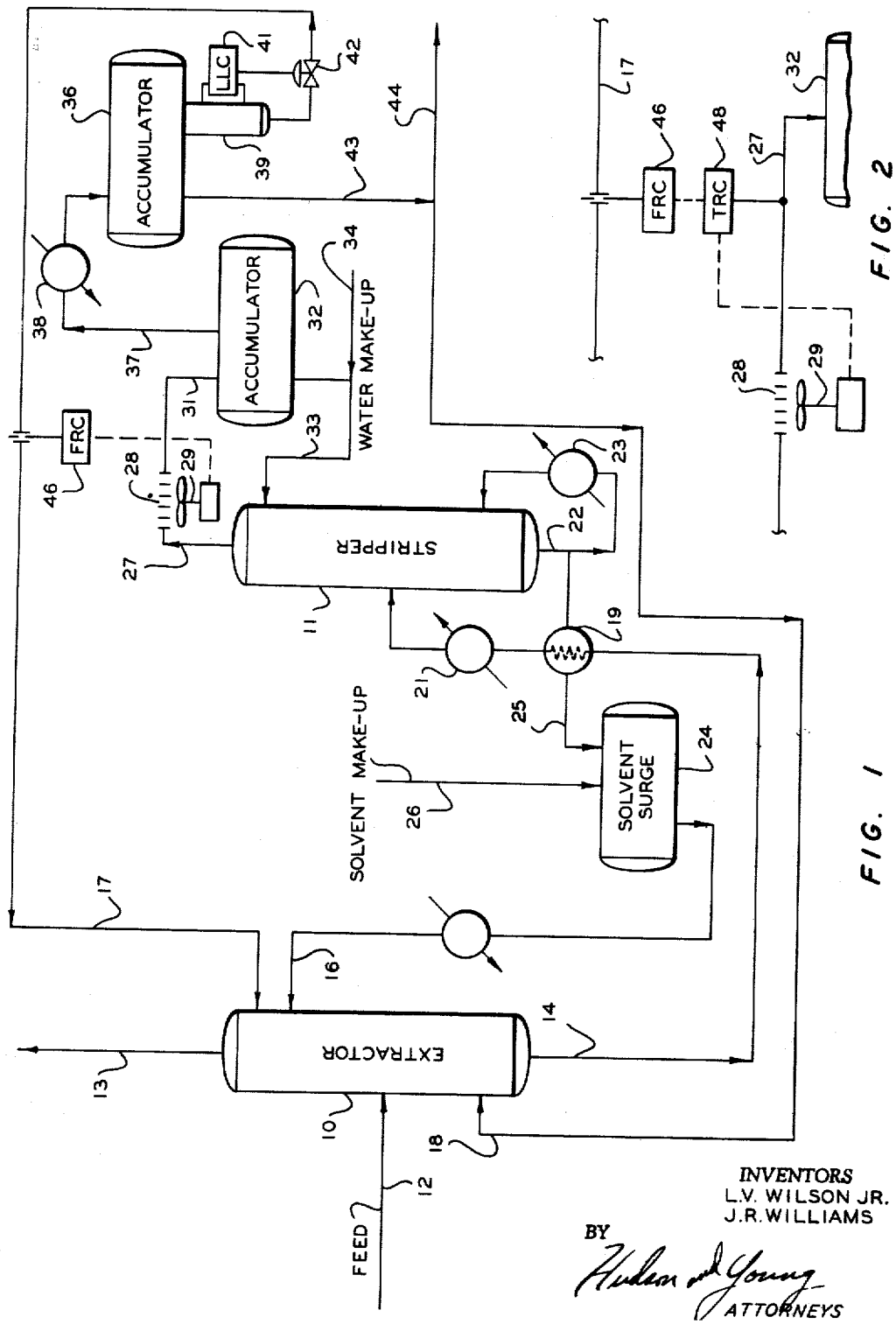

3,094,571
SOLVENT EXTRACTION PROCESS
Lawrence V. Wilson, Jr., and Jack R. Williams, Bartlesville, Okla., assignors to Phillips Petroleum Company, a corporation of Delaware
Filed Nov. 28, 1958, Ser. No. 776,849
10 Claims. (Cl. 260—681.5)

This invention relates to an improved solvent extraction process. In a further aspect, this invention relates to apparatus for carrying out a solvent extraction process.

Solvent extraction is a well-known and commonly used process for treatment of hydrocarbon mixtures. When such a hydrocarbon mixture is treated with a solvent material, it is known that the various components are soluble to varying extents and it is therefore possible to separate the material into the different types. With the commonly used solvents, the aromatic components are more soluble than are other classes of hydrocarbons, the solubility of the other classes of hydrocarbons decreasing in the order: cycloolefins, branched chain olefins, naphenes, isoparaffins, and straight chain paraffins. The present invention is directed to such a separation and, for the sake of convenience, the feed stock can be characterized as containing a class A and a class B compound wherein the class A compound is more soluble in the solvent phase than the class B compound. When such a mixture is treated with the solvent, a raffinate is produced comprising the class B compound and the extract is the solvent having the class A compound dissolved therein.

The following are objects of our invention.

An object of our invention is to provide an improved solvent extraction process. A further object of our invention is to provide apparatus for carrying out this improved process. A further object of our invention is to provide a solvent extraction system which is regulated to provide a saving in overall heat transfer. A further object of our invention is to provide a control system for automatically reducing the heat requirements of the system.

Other objects and advantages of our invention will be apparent to one skilled in the art upon reading this disclosure, accompanying and forming a part of which is a drawing including FIGURE 1, a schematic drawing showing the system of the present invention including a control circuit therefor and FIGURE 2, a modification of the control system of FIGURE 1.

The novel feature of the present invention resides, broadly, in an improvement in handling the overhead from a solvent stripping zone, this improvement being directed to the treatment of the overhead from this stripping zone, said overhead containing a higher boiling material and a lower boiling material and wherein a portion of the higher boiling material is used as reflux for the stripping zone. The improvement comprises condensing at least a portion of the higher boiling material in a first condensing zone without condensing the lower boiling material, returning said condensed higher boiling material to the stripping zone as reflux, and subsequently condensing the remainder of the overhead of the stripping zone. In another aspect, the invention resides in a combination solvent extraction-rich solvent stripping process which comprises contacting in an extraction zone a feed stock mixture comprising organic compounds of class A and of class B with a solvent mixture comprising an organic solvent and water, said class A compound being relatively more soluble in said solvent mixture than said class B compound, forming thereby a raffinate comprising said class B compound and an extract comprising said solvent mixture and said class A compound, introducing said extract into a stripping zone whereby there is produced an overhead stream comprising said class A compound and a portion of said water and a bottom stream comprising said organic solvent and the remainder of the water, cooling said overhead stream in a first condensation zone to condense a portion of the water therein but not said class A compound, returning said condensed water to said stripping zone as reflux, cooling the remainder of said overhead stream in a second condensation zone to condense said class A compound and the remainder of the water therein, separating said condensed class A compound from said water and recovering said condensed class A compound as a product of the process, returning water separated from said condensed class A compound to said extraction zone, and varying the amount of cooling in said first condensation zone to condense all but a predetermined amount of water therein.

Directing attention to FIGURE 1, the system of the invention will now be explained, using, for convenience, the separation of a diolefin from an olefin. Of course the method of our invention is applicable to other separations such as an olefin from a paraffin and the other separations previously mentioned. The apparatus includes an extractor 10 and a stripper 11, these being the primary components of the apparatus. Extractor 10 is provided with a feed conduit 12, a raffinate removal conduit 13, an extract removal conduit 14, a solvent supply conduit 16, a water supply conduit 17, and an extract reflux supply conduit 18. Conduit 14 supplies the extract to stripper 11 after passing through heat exchangers 19 and 21. Stripper 11 is also provided with stripped solvent removal conduit 22 and reboiler 23. Conduit 25 extends from conduit 22 to solvent surge tank 24 and conduit 16 extends from surge tank 24, this being the solvent supply to extractor 10. Solvent makeup is supplied to tank 24 by means of conduit 26. Extending from the top of stripper 11 is conduit 27, this conduit extending to an air fin cooler or condenser 28, this condenser being provided with a variable pitch fan 29. Conduit 31 extends from condenser 28 to accumulator 32. Conduit 33 extends from the lower portion of accumulator 32 to the upper end portion of stripper 11. Makeup water supply conduit 34 communicates with conduit 33. A second accumulator 36 is provided and conduit 37 having heat exchanger 38 therein extends to said accumulator 36. Accumulator 36 is provided with well 39 from which conduit 17 extends to the upper end portion of extractor 10. Well 39 is provided with a liquid level controller 41 which is operatively connected to valve 42 for control of liquid removal from well 39. Conduit 43 extends from an intermediate level in accumulator 36 this conduit 43 communicating with product removal conduit 44 and extract reflux conduit 18.

The control system for this invention, as shown in FIGURE 1, includes a flow recorder controller 46 which measures flow in conduit 17 and is operatively connected to adjustable propeller 29. The operation of this flow recorder controller is more fully explained hereinafter.

The modification in FIGURE 2 is very similar to that shown in FIGURE 1 and common identification numerals are used. Added in the system as shown in FIGURE 2, is a temperature recorder controller 48, this measuring the temperature in conduit 27. The output from flow recorder controller 46 which overrides the output from temperature recorder controller 48 which is, in turn, connected to adjustable propeller 29.

In the operation of the method of this invention the feed containing a closely boiling mixture of at least one diolefin and at least one monolefin is supplied to extractor 10 through conduit 12. A solvent is used which preferentially dissolves the diolefin, this solvent being supplied by conduit 16. The raffinate is then removed through conduit 13, this comprising the major portion of the paraffins supplied to extractor 10. Water is supplied to the top of extractor 10 to wash solvent from the raffinate and a portion of the diolefin recovered in the process is supplied to the lower end portion of the column by means of conduit 18. The extract, containing the diolefin and a mixture of water and the selective solvent is removed by conduit 14 and passed to stripper 11. In stripper 11 the diolefin and a portion of the water are removed overhead and the stripped solvent along with the remainder of the water are removed from the lower end portion of the column by means of conduit 22. The overhead in conduit 27 is passed through condenser 28 and a portion of the water condensed therein, this water being collected in accumulator 32 from which it is returned to stripper 11. Uncondensed material passes from accumulator 32 by means of conduit 37 through heat exchanger 38 to acmumulator 36. Sufficient cooling is supplied by condenser 38 to condense the remainder of the water and the diolefin. These materials separate by phases and the water is returned to extractor 10 by means of conduit 17 while the diolefin is recovered in conduit 43, a portion of this being the product of the process and recovered by conduit 44 and a portion being returned to extractor 10.

The improvement of the present invention resides in the control obtained by the use of flow recorder controller 46. In this system flow recorder 46 is set to permit flow of only the quantity of water desired for use in extractor 10. The controller adjusts propeller 29 so that all but this desired amount of water is condensed in air fin condenser 28. An advantage of this invention is a saving in heat requirement. The water returned as reflux to stripper 11 can be returned at a higher temperature than that supplied to extractor 10. Prior operation has involved condensing all of the overhead from stripper 11 and then reheating the portion returned to stripper 11. By using the 2-stage condensation, this reheating is unnecessary.

A modification which provides better control and more uniform operation is shown in FIGURE 2. Minor changes in the temperature of the material in line 27 are sensed by temperature recorder controller 48 which is added in this modification. This provides for small changes in the amount of condensation in condenser 28. Flow recorder controller 46 is still used and this is the over-riding controller, this providing for constant flow through conduit 17.

As will be recognized by those skilled in the art, a large number of separations are possible using the system of this invention and a large number of compounds are suitable as the selected solvent. Particularly suitable solvents are the aliphatic and cyclic alcohols, the glycols and glycol ethers (also referred to as polyalkylene glycols) as well as the glycol esters and glycol ether-esters. Alkylene glycols and polyoxy-polyalkylene glycols which are an effective class of solvents include the di-, tri-, and tetra-oxyethylene glycols, particularly oxy-diethylene glycol, mono-, di-, and tri-oxy-propylene glycols and mono-, di-, and trioxy-butylene glycols; certain glycol ethers, such as the Cellosolve series of compounds (defined structurally as the alkyl ethers of ethylene glycol), including methyl-, ethyl-, propyl-, and butyl-Cellosolve; the Carbitols (defined structurally as the alkyl ethers of diethylene glycol), such as methyl-, ethyl-, propyl-, and butyl-Carbitols; the glycol and polyoxyalkylene glycol esters of low molecular weight organic acids such as the acetates and propionates; the aliphatic alcohols, such as propanol, isopropanol, n-butanol, tert-butanol, etc,; certain cyclic alcohols, such as cyclopentanol, cyclohexanol, cycloheptanol, etc.; and other oxygen-containing organic compounds such as phenol, resorcinol, pyrocatechol, etc.; various alkyl phenols, such as the ortho-, meta-, and paracresols, thymol, etc.; the organic acid esters, and particularly the fatty acid esters of aliphatic alcohols and especially the esters of relatively low molecular weight organic acids, such as the acetates, propionates, butyrates, and valerates, and other solvents of the general class comprising the oxygen-containing organic compounds hereinabove described and generally well known in the art.

The solvent contains a secondary component in admixture with the principal solvent component which increases the selectivity of the solvent mixture for the extracted component primarily recovered in the extraction process, the secondary component being a compound which is substantially immiscible with the feed stock. One of the preferred secondary solvents utilizable in admixture with the principal solvent component is water, present in the mixed selective solvent in an amount sufficient to yield a mixture containing from about 1 to about 75 percent by weight of water and preferably from about 5 to about 25 percent.

Of current importance are such separations as isoprene from isopentene and isopentene from isopentane and the following example illustrates the particular conditions used and flow rates for the separation of isoprene from isopentene and the conditions in the parts of the apparatus but it will be understood that considerable variation from the exact temperatures and pressure are possible.

*Example*

Using as the selective solvent, a mixture of water and the monomethyl ether of diethylene glycol (Methyl Carbitol), isoprene can be easily separated from a mixture thereof with isopentane and/or isopentenes. In this separation the extractor is operated at 100° F. and a pressure of 30 p.s.i.a. The stripper has a top temperature of 213° F. and a pressure of 25 p.s.i.a., while the kettle is heated to 278° F. and has a pressure of 30 p.s.i.a. The following material balance sets forth flow in this system, the amounts being given in pounds per stream hour:

| Stream | Extractor Feed 12 | Raffinate 13 | Water Make-up 34 | Methyl Carbitol Make-up 26 | Raffinate Wash Water 17 | Extract Stripper Reflux 33 | Extractor Bottoms 14 | Lean Solvent 25 | Extract Reflux 17 | Isoprene Product 44 |
|---|---|---|---|---|---|---|---|---|---|---|
| Butenes | 12 | 12 | | | | | | | | |
| Butane | 6 | 6 | | | | | 256 | | 240 | 16 |
| 3-Methyl-1-butene | 1,165 | 1,149 | | | | | | | | |
| Isopentane | 40,814 | 40,814 | | | | | 128 | | 120 | 8 |
| 1-pentene | 864 | 856 | | | | | 1,232 | | 1,155 | 77 |
| 2-Methyl-1-butene | 6,572 | 6,495 | | | | | 162,336 | | 152,190 | 10,146 |
| Isoprene | 10,476 | 330 | | | | | | | | |
| Pentane | 3,634 | 3,634 | | | | | 496 | | 465 | 31 |
| 2-Pentene | 2,400 | 2,369 | | | | | 1,472 | | 1,380 | 92 |
| 2-Methyl-2-butene | 7,166 | 7,074 | | | | | 8,992 | | 8,430 | 562 |
| Piperylene | 584 | 22 | | | | | 442,650 | 432,586 | 60 | 4 |
| Water | | | 40 | | 10,000 | 59,200 | | | | |

From this material balance it will be seen that it is necessary to return 10,000 pounds per hour of water to the extractor. In accordance with this invention, the remainder of the water in conduit 27 is condensed in air fin cooler 28 and, in this example, this result will be obtained by supplying sufficient cooling to cool the stream in conduit 27 to 153° F. This will condense the 59,200 pounds of water for return to stripper 11. The balance of the overhead from stripper 11 is cooled to 100° F. by means of condenser 38 for complete condensation in accumulator 36. This supplies the water for return by conduit 17 to extractor 10. When, due to change in the feed or other variations in the system, a smaller amount of water is condensed in condenser 28, flow through conduit 17 will tend to increase. This flow, measured by controller 46, then increases the speed or pitch or propeller 29 to increase the condensation therein which, in turn, reduces the flow in conduit 17.

Of course, depending upon the composition of the feed stream and the separation desired, a range of conditions can be used in accumulator 32. A preferred range is from 1 to 10 atmospheres and a temperature of from 135 to 245° F. to provide 10,000 pounds per hour of water for the extractor and approximately 175,000 pounds per hour of hydrocarbon in the stripper overhead.

To reduce undesired fluctuation in flow, the system of FIGURE 2 can be used. In this system, the temperature is continually measured in conduit 27 and minor adjustments are made by controller 48. Controller 46 is still the overriding controller and if the changes made by controller 48 are insufficient to provide constant flow in conduit 17, controller 46 then adjusts the cooling in condenser 28.

It will be seen that this invention provides improved operation by using two-stage condensation of the stripper overhead. Only the desired amount of water is returned to the extractor and the recycle water to the extractor and the stripper is supplied containing the desired and different heat quantity for each piece of the apparatus. This two-stage condensation is regulated for this saving in heat by controlling the conditions of the first condensation zone in response to the flow of water to the extractor and, if desired, in response to the temperature of the condensate from condenser 28.

Controllers 46 and 48 are standard instruments available to the art, such instruments being available from, for example, the Brown Instrument Company. Adjustable pitch propellers used in this invention can be obtained from the Griscom-Russell Company and the Fluor Corporation, Ltd.

As many possible embodiments can be made of this invention without departing from the scope thereof, it is to be understood that all matter herein set forth is to be interpreted as illustrative and not as unduly limiting the invention.

We claim:

1. In the operation of a stripping zone containing a solvent and two substantially immiscible solutes of different boiling points whereby there is produced an overhead stream comprising the lower boiling solute and a portion of the higher boiling solute and a bottom stream comprising a solvent for said lower boiling solute and the remainder of the higher boiling solute and wherein a portion of the higher boiling solute in the overhead stream is condensed and used to supply reflux to the stripping zone and the remainder of the overhead material is separately condensed, the improvement comprising condensing at least a portion of the higher boiling solute in said overhead stream in a first condensing zone therein without condensing said lower boiling solute by controlling the amount of cooling therein responsive to changes in the amount of higher boiling solute subsequently condensed, returning said condensed higher boiling solute to said stripping zone as reflux, and subsequently condensing the remainder of said overhead stream.

2. The process of claim 1 wherein said solvent comprises the monomethyl ether of diethylene glycol, the higher boiling solute comprises water, and the lower boiling solute comprises isoprene.

3. The process of claim 1 wherein said solvent comprises the monomethyl ether of diethylene glycol, the higher boiling solute comprises water, and the lower boiling solute comprises isopentene.

4. In the operation of a stripping zone containing a solvent and two substantially immiscible solutes of different boiling points whereby there is produced an overhead stream comprising the lower boiling solute and a portion of the higher boiling solute and a bottom stream comprising a solvent for said lower boiling solute and the remainder of the higher boiling solute and wherein a portion of the higher boiling solute in the overhead stream is condensed and used to supply reflux to the stripping zone and the remainder of the overhead material is separately condensed, the improvement comprising condensing at least a portion of the higher boiling solute in said overhead stream in a first condensing zone without condensing said lower boiling solute by first controlling the amount of cooling therein responsive to changes in the amount of higher boiling solute subsequently condensed and further controlling the condensation in said first condensation zone in response to the temperature of the condensate leaving said first condensation zone, said first control overriding said temperature control returning said condensed higher boiling solute to said stripping zone as reflux and subsequently condensing the remainder of said overhead stream.

5. The process of claim 4 wherein said solvent comprises the monomethyl ether of diethylene glycol, said higher boiling solute comprises water, and said lower boiling solute comprises isoprene.

6. The process of claim 4 wherein said solvent comprises the monomethyl ether of diethylene glycol, said higher boiling solute comprises water, and said lower boiling solute comprises isopentene.

7. A combination solvent extraction-rich solvent stripping process which comprises contacting in an extraction zone a feed stock mixture comprising organic compounds of class A and of class B with a solvent mixture comprising an organic solvent and water, said class A compound being substantially immiscible with water and relatively more soluble in said solvent mixture than said class B compound, forming thereby a raffinate comprising said class B compound and an extract comprising said solvent mixture and said class A compound, introducing said extract into a stripping zone whereby there is produced an overhead stream comprising said class A compound and a portion of said water and a bottom stream comprising said organic solvent and the remainder of the water, cooling said overhead stream in a first condensation zone to condense a portion of the water therein but not said class A compound, returning said condensed water to said stripping zone as reflux, cooling the remainder of said overhead stream in a second condensation zone to condense said class A compound and condensing in said first condensation zone all but the amount of water returned to said extraction zone by the remainder of the water therein, separating said condensed class A compound from said water and recovering said condensed class A compound as a product of the process, returning water separated from said condensed class A compound to said extraction zone, and varying the amount of cooling in said first condensation zone responsive to the changes in demand for water by said extraction zone.

8. A combination solvent extraction-rich solvent stripping process for separating isoprene from a stream containing the same and isopentane comprising contacting said stream with a solvent mixture comprising water and the monomethyl ether of diethylene glycol in an extraction zone forming thereby a raffinate comprising isopentane and an extract comprising said solvent mixture and isoprene, introducing said extract into a stripping zone whereby there is produced an overhead stream comprising isoprene and a portion of the water and a bottom stream comprising the monomethyl ether of diethylene glycol and the remainder of the water, cooling said overhead in a first condensation zone to condense a portion of the water therein but not said isoprene, returning said condensed water to said stripping zone as reflux, cooling the remainder of said overhead stream in a second condensation zone to condense said isoprene and the remainder of the water therein, separating said condensed isoprene from said water and recovering said condensed isoprene as a product of the process, returning water separated from said isoprene to said extraction zone, and condensing in said first condensation zone all but the amount of water returned to said extraction zone by varying the amount of cooling in said first condensation zone responsive to the changes in demand for water by said extraction zone.

9. Apparatus comprising a stripping column, said stripping column being provided with a feed inlet, a kettle product removal conduit, and an overhead removal conduit; a first accumulator; a third conduit extending from said overhead removal conduit to said first accumulator; first cooling means intermediate the ends of said third conduit; a reflux return conduit extending from the lower end portion of said first accumulator to the upper end portion of said stripping column; a second accumulator; a fifth conduit extending from the upper end portion of said first accumulator to said second accumulator; second cooling means intermediate the ends of said fifth conduit; a liquid removal conduit extending from the lower end portion of said second accumulator; and means to adjust the amount of cooling supplied by said first cooling means in response to a signal from a liquid flow measuring means in said last-mentioned liquid removal conduit.

10. Apparatus comprising a stripping column, said stripping column being provided with a feed inlet, a kettle product removal conduit, and an overhead removal conduit; a first accumulator; a third conduit extending from said overhead removal conduit to said first accumulator; first cooling means intermediate the ends of said third conduit; a reflux return conduit extending from the lower end portion of said first accumulator to the upper end portion of said stripping column; a second accumulator; a fifth conduit extending from the upper end portion of said first accumulator to said second accumulator; second cooling means intermediate the ends of said fifth conduit; a liquid removal conduit extending from the lower end portion of said second accumulator; and means to adjust said first cooling means in response to a signal from a temperature measuring means in the liquid in the conduit intermediate the first cooling means and said first accumulator, and in response to a signal from a liquid flow measuring means in said liquid removal conduit extending from the lower end portion of said second accumulator, said liquid flow measuring means overriding the temperature measuring means.

References Cited in the file of this patent

UNITED STATES PATENTS

| | | |
|---|---|---|
| 836,022 | Erwin | Nov. 13, 1906 |
| 1,448,709 | Schutze | Mar. 13, 1923 |
| 1,730,892 | Leslie | Oct. 8, 1929 |
| 2,050,329 | Johnson | Aug. 11, 1936 |
| 2,529,274 | Arnold et al. | Nov. 7, 1950 |
| 2,588,303 | Stanley | Mar. 4, 1952 |
| 2,652,439 | Neuhart et al. | Sept. 15, 1953 |
| 2,661,266 | Friden et al. | Dec. 1, 1953 |
| 2,770,663 | Grote | Nov. 13, 1956 |

UNITED STATES PATENT OFFICE
CERTIFICATE OF CORRECTION

June 18, 1963

Patent No. 3,094,571

Lawrence V. Wilson, Jr., et al.

It is hereby certified that error appears in the above numbered patent requiring correction and that the said Letters Patent should read as corrected below.

Column 5, line 56, strike out "therein"; column 6, lines 46 and 47, begining with "condensing in" strike out all to and including "zone, and" in line 54, same column 6, and insert instead -- the remainder of the water therein, separating said condensed class A compound from said water and recovering said condensed class A compound as a product of the process, returning water separated from said condensed class A compound to said extraction zone, and condensing in said first condensation zone all but the amount of water returned to said extraction zone by --.

Signed and sealed this 21st day of January 1964.

(SEAL)
Attest:
ERNEST W. SWIDER

Attesting Officer

EDWIN L. REYNOLDS

Acting Commissioner of Patents